United States Patent
Tsai

(10) Patent No.: US 10,520,159 B1
(45) Date of Patent: Dec. 31, 2019

(54) VEHICLE LAMP

(71) Applicant: Optronics International, LLC, Tulsa, OK (US)

(72) Inventor: Hsi-Hsien Tsai, Tainan (TW)

(73) Assignee: Optronics International, LLC, Tulsa, OK (US)

( * ) Notice: Subject to any disclaimer, the term of this patent is extended or adjusted under 35 U.S.C. 154(b) by 0 days.

(21) Appl. No.: 16/401,437

(22) Filed: May 2, 2019

(30) Foreign Application Priority Data

Oct. 16, 2018 (TW) .............................. 107213966 U

(51) Int. Cl.
*F21S 43/20* (2018.01)
*F21S 43/14* (2018.01)
*F21S 43/19* (2018.01)
*F21V 11/08* (2006.01)

(52) U.S. Cl.
CPC .............. *F21S 43/26* (2018.01); *F21S 43/14* (2018.01); *F21S 43/19* (2018.01); *F21V 11/08* (2013.01)

(58) Field of Classification Search
CPC . F21S 43/26; F21S 43/14; F21S 43/19; F21V 11/08
USPC ......................................................... 362/521
See application file for complete search history.

(56) References Cited

U.S. PATENT DOCUMENTS

| | | | | |
|---|---|---|---|---|
| 7,150,553 | B2 * | 12/2006 | English | B60Q 1/2696 362/545 |
| 7,914,162 | B1 * | 3/2011 | Huang | B60L 1/14 362/92 |
| 9,062,845 | B1 * | 6/2015 | Tsai | B60Q 1/0052 |
| 9,291,327 | B2 * | 3/2016 | Rodriguez | F21V 5/007 |
| 2002/0003708 | A1 * | 1/2002 | Roller | B60Q 1/32 362/521 |
| 2002/0034078 | A1 * | 3/2002 | Natsume | F21S 43/14 362/509 |
| 2009/0097260 | A1 * | 4/2009 | Dielen | F21V 11/08 362/317 |
| 2011/0235337 | A1 * | 9/2011 | Jacksen | F21V 3/04 362/308 |
| 2013/0027956 | A1 * | 1/2013 | Dubosc | F21S 43/145 362/511 |
| 2015/0036371 | A1 * | 2/2015 | Ichikawa | B60Q 1/2665 362/511 |
| 2015/0291085 | A1 * | 10/2015 | Manning | B60Q 1/2619 362/516 |
| 2016/0091174 | A1 * | 3/2016 | Hiki | F21S 41/336 362/297 |
| 2016/0102835 | A1 * | 4/2016 | Baccarin | F21S 43/145 362/516 |

* cited by examiner

*Primary Examiner* — Bryon T Gyllstrom
(74) *Attorney, Agent, or Firm* — Burris Law, PLLC

(57) ABSTRACT

A vehicle lamp includes a lighting unit and a lens unit. The lighting unit includes pluralities of first and second light-emitting members. The lens unit includes a dispersing lens, a cover lens having a dispersing portion and a concentrating portion, and a shielding layer that has a light-transmissible section. Light emitted by the first light-emitting members passes through the dispersing lens, the light-transmissible section of the shielding layer, and the dispersing portion of the cover lens to produce a dispersing light pattern, and light emitted by the second light-emitting members passes through the concentrating portion of the cover lens to produce a concentrated light pattern.

9 Claims, 5 Drawing Sheets

VEHICLE LAMP

CROSS-REFERENCE TO RELATED APPLICATION

This application claims priority of Taiwanese Patent Application No. 107213966, filed on Oct. 16, 2018.

FIELD

The disclosure relates to a vehicle lamp, more particularly to a vehicle lamp with multiple functions.

BACKGROUND

To light up roadways and to increase the visibility of a vehicle, the vehicle usually has a number of lighting and signaling devices including head lamps, tail lamps, brake lights, turn signals, etc. With conventional single-function vehicle lamps, to install all different types of vehicle lamps on the vehicle may result in complicated structural and electrical designs of the vehicle.

SUMMARY

Therefore, the object of the disclosure is to provide a vehicle lamp that can alleviate at least one of the drawbacks of the prior art.

According to the disclosure, a vehicle lamp includes a lamp seat, a lighting unit, and a lens unit.

The lamp seat unit defines a receiving space that has an opening.

The lighting unit is disposed in the receiving space and includes a first circuit board, a second circuit board that substantially surrounds the first circuit board, a plurality of first light-emitting members that are electrically mounted to the first circuit board, and a plurality of second light-emitting members that are electrically mounted to the second circuit board.

The lens unit includes a dispersing lens that covers the first light-emitting members, a cover lens that is disposed at the opening, and a shielding layer.

The cover lens covers the second light-emitting members and the dispersing lens, and has a dispersing portion aligned with the dispersing lens, and a concentrating portion surrounding the dispersing portion and aligned with the second circuit board.

The shielding layer is mounted to one of the dispersing lens and the dispersing portion, and has an opaque section and a light-transmissible section.

Light emitted by the first light-emitting members passes through the dispersing lens, the light-transmissible section of the shielding layer, and the dispersing portion of the cover lens to produce a dispersing light pattern, the dispersing light pattern having a dark region that results from a shadow of the opaque section of the shielding layer, and a light region that corresponds to the light-transmissible section of the shielding layer. Light emitted by the second light-emitting members passes through the concentrating portion of the cover lens to produce a concentrated light pattern that surrounds the dispersing light pattern.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
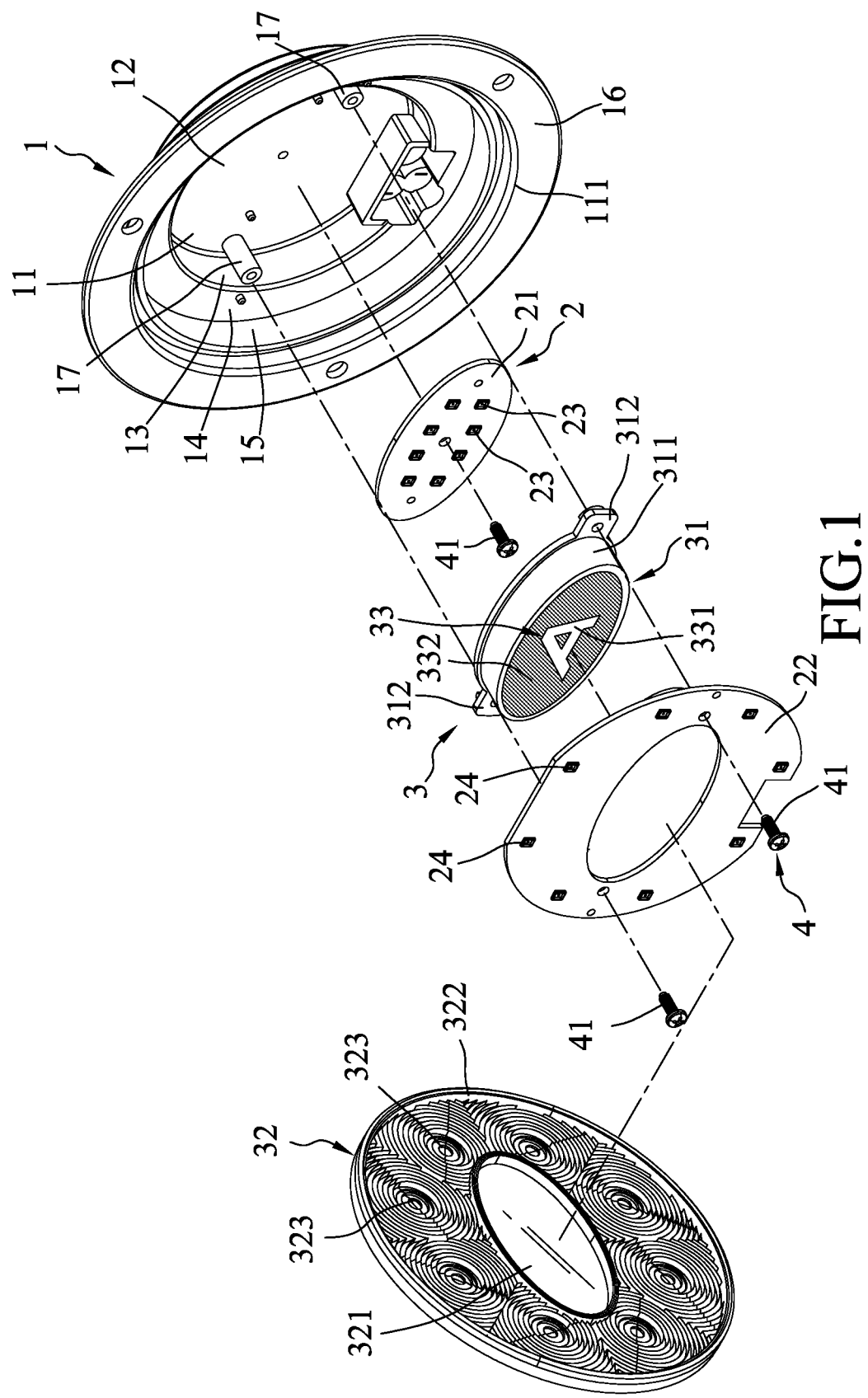
FIG. 1 is an exploded perspective view of a first embodiment of a vehicle lamp according to the disclosure.

Before the present invention is described in greater detail, it should be noted that where considered appropriate, reference numerals or terminal portions of reference numerals have been repeated among the figures to indicate corresponding or analogous elements, which may optionally have similar characteristics.

Figure 2:
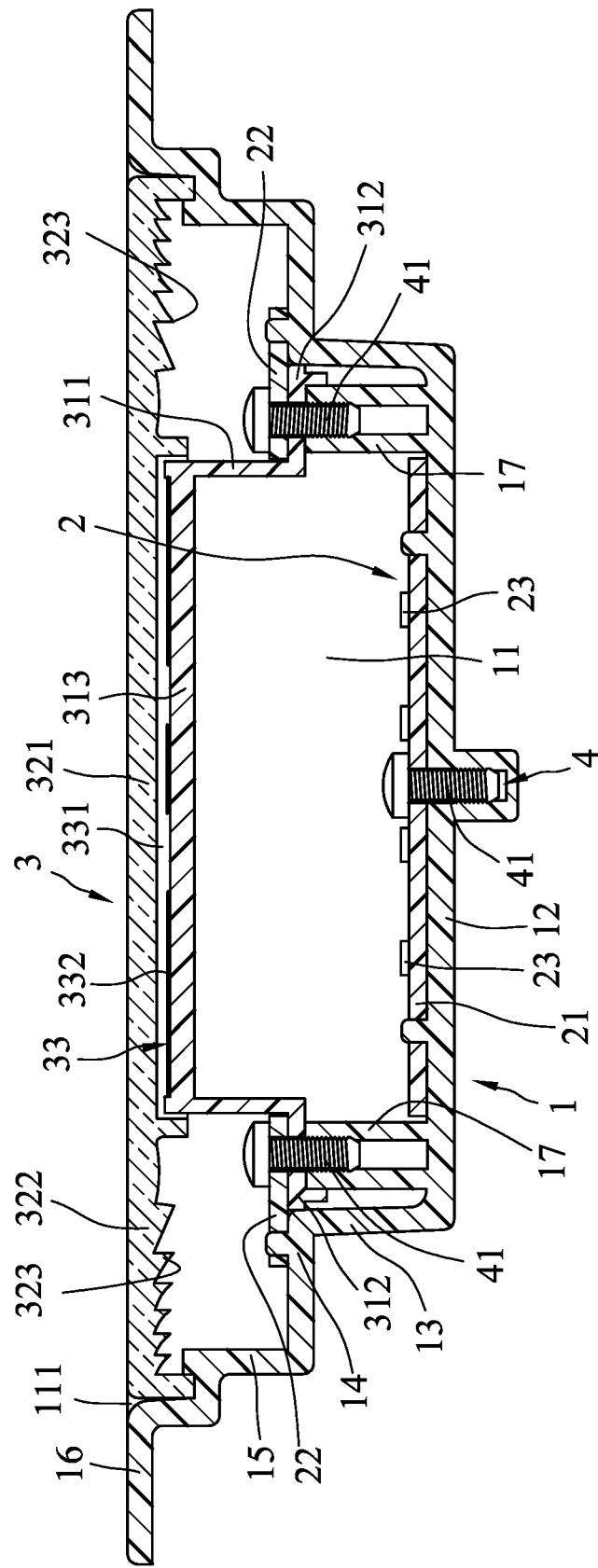
FIG. 2 is a sectional view of the first embodiment.

Referring to FIGS. 1 and 2, a first embodiment of a vehicle lamp according to the disclosure is adapted for installing onto a vehicle (not shown) and may act as a tail light, a head lamp, a daytime running lamp, a brake light, a turn signal, etc. In this embodiment, the vehicle lamp is exemplified as a tail light with additional brake light and turn signal functions. The vehicle lamp includes a lamp seat unit 1, a lighting unit 2, a lens unit 3, and a securing unit 4.

The lamp seat unit 1 defines a receiving space 11 that has an opening 111. In the first embodiment, the lamp seat unit 11 has abase wall 12, a first surrounding wall 13 that extends from a periphery of the base wall 12 and that surrounds an axis, a shoulder segment 14 that extends outwardly from an end of the first surrounding wall 13 distal from the base wall 12 and that extends away from the axis, a second surrounding wall 15 that extends from a periphery of the shoulder wall 14 and that extends away from the first surrounding wall 13, a rim wall 16 that extends outwardly from an end of the second surrounding wall 15 distal from the shoulder segment 14 and that extends away from the axis, and a plurality of supporting members 17 that extend from the base wall 12 towards the opening 111. The base wall 12, the first surrounding wall 13, the shoulder wall 14, the second surrounding wall 15 and the rim wall 16 cooperatively define the receiving space 11. The lamp seat unit 1 in the first embodiment has a substantially stepped and circular structure. However, the shape and the structure of the lamp seat unit 1 may vary based on actual requirements.

The lighting unit 2 is disposed in the receiving space 11 and includes a first circuit board 21, a second circuit board 22 that substantially surrounds the first circuit board 21, a plurality of first light-emitting members 23 that are electrically mounted to the first circuit board 21, and a plurality of second light-emitting members 23 that are electrically mounted to the second circuit board 21. The first circuit board 21 and the second circuit board 22 are spaced apart from each other, and are respectively disposed on the base wall 12 and the shoulder wall 14. In this embodiment, the first circuit board 21 is substantially elliptical and the second circuit board 22 is annular with an elliptical hole in the center, but is not limited in this respect. In this embodiment, the first and second light-emitting members 23, 24 are exemplified to be light-emitting diodes (LEDs), but in other embodiments, they may be cold cathode fluorescent lamps, incandescent light bulb, etc. Quantities and arrangements of the first and second light-emitting members 23, 24 respectively mounted to the first and second circuit boards 21, 22 may also be adjusted according to different needs.

The lens unit 3 is disposed on the lamp seat unit 1 and includes a dispersing lens 31 that covers the first light-emitting members 23, a cover lens 32 that is disposed at the opening 111, and a shielding layer 33.

The dispersing lens 31 has a surrounding segment 311 that is tubular and that substantially surrounds the first light-emitting members 23, a plurality of ear segments 312 extending outwardly from an end of the surrounding segment 311 which is proximal to the first light-emitting members 23, and a dispersing segment 313 that is connected to an end of the surrounding segment 311 distal from the first light-emitting members 23. The ear segments 312 respectively abut against the supporting members 17. The dispersing segment 313 diffuses light passing therethrough to produce a surface source of light with even distribution of intensity.

The cover lens 32 covers the second light-emitting members 24 and the dispersing lens 31, and has a dispersing portion 321 that is aligned with the dispersing lens 31 and a concentrating portion 322 that surrounds the dispersing portion 321 and that is aligned with the second circuit board 22. The concentrating portion 322 of the cover lens 32 has an inner surface that faces the second light-emitting members 24 and that is formed with a plurality of optical microstructures 323 that are respectively aligned with the second light-emitting members 24. In this embodiment, each of the optical microstructures 323 has a plurality of concentric annular prisms with a common center aligning with the respective second light-emitting member 24.

In this embodiment, the shielding layer 33 is a printed layer and has an opaque section 332 a light-transmissible region 331 (e.g., a hollow region) which defines a shape, for example, a logo of a car brand. In the first embodiment, the shielding layer 33 is mounted to the dispersing segment 313 of the dispersing lens 31. In certain embodiments, the shielding layer 33 may be mounted to the dispersing portion 321 of the cover lens 32 instead. In other embodiments, the shielding layer 33 may be structures other than a printed layer, such as an electro-deposited coating, a film, a sticker, etc.

The securing unit 4 includes a plurality of securing members 41 that are spaced apart from each other. In the first embodiment, at least one of the securing members 41 extends through the first circuit board 21 and is engaged threadedly with the base segment 12. The rest of the securing members 41 extend through the second circuit board 21 and respectively through the ear segments 312, and are engaged threadedly and respectively with the supporting members 17.

Figure 3:
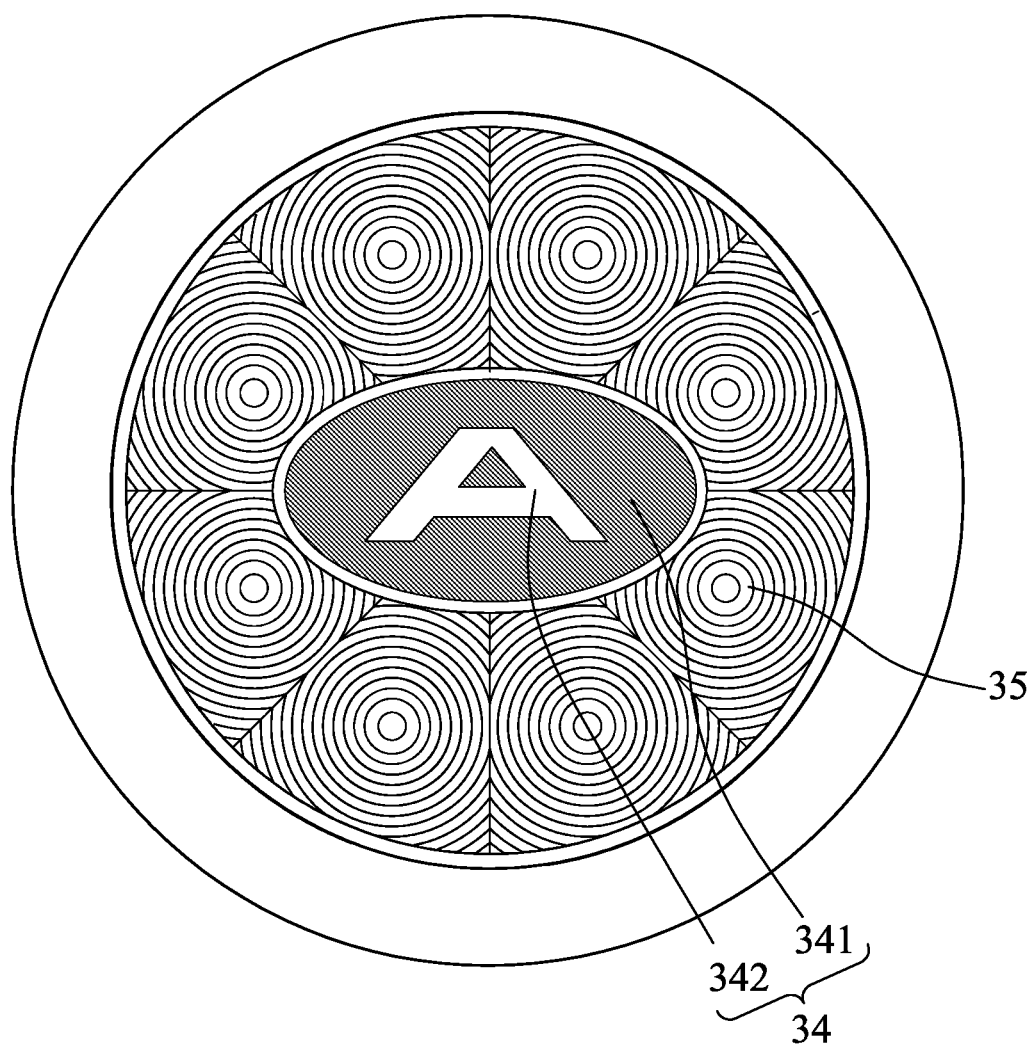
FIG. 3 shows light patterns produced by the first embodiment.

Referring to FIG. 3, when the vehicle lamp installed on a vehicle is activated, the first light-emitting members 23 are kept activated to provide tail light function. Light emitted by the first light-emitting members 23 passes through the dispersing lens 31, the light-transmissible section 331 of the shielding layer 33 and the dispersing portion 321 of the cover lens 32 to produce a dispersing light pattern 34. The dispersing light pattern 34 has a dark region 341 that results from a shadow of the opaque section 332 of the shielding layer 33, and a light region 342 that corresponds to the light-transmissible section 331 of the shielding layer 33.

When the vehicle brakes, the second light-emitting members 24 are activated to provide brake light function. When the vehicle is about to make a turn, the second light-emitting members 24 may be intermittently activated to provide turn signal function. Light emitted by the second light-emitting members 24 passes through the concentrating portion 322 of the cover lens 32 to produce a concentrated light pattern 35 that surrounds the dispersing light pattern 34. Simultaneously, the intensity of the light emitted by the first light-emitting members 23 is also increased to support the brake-light function.

Figure 4:
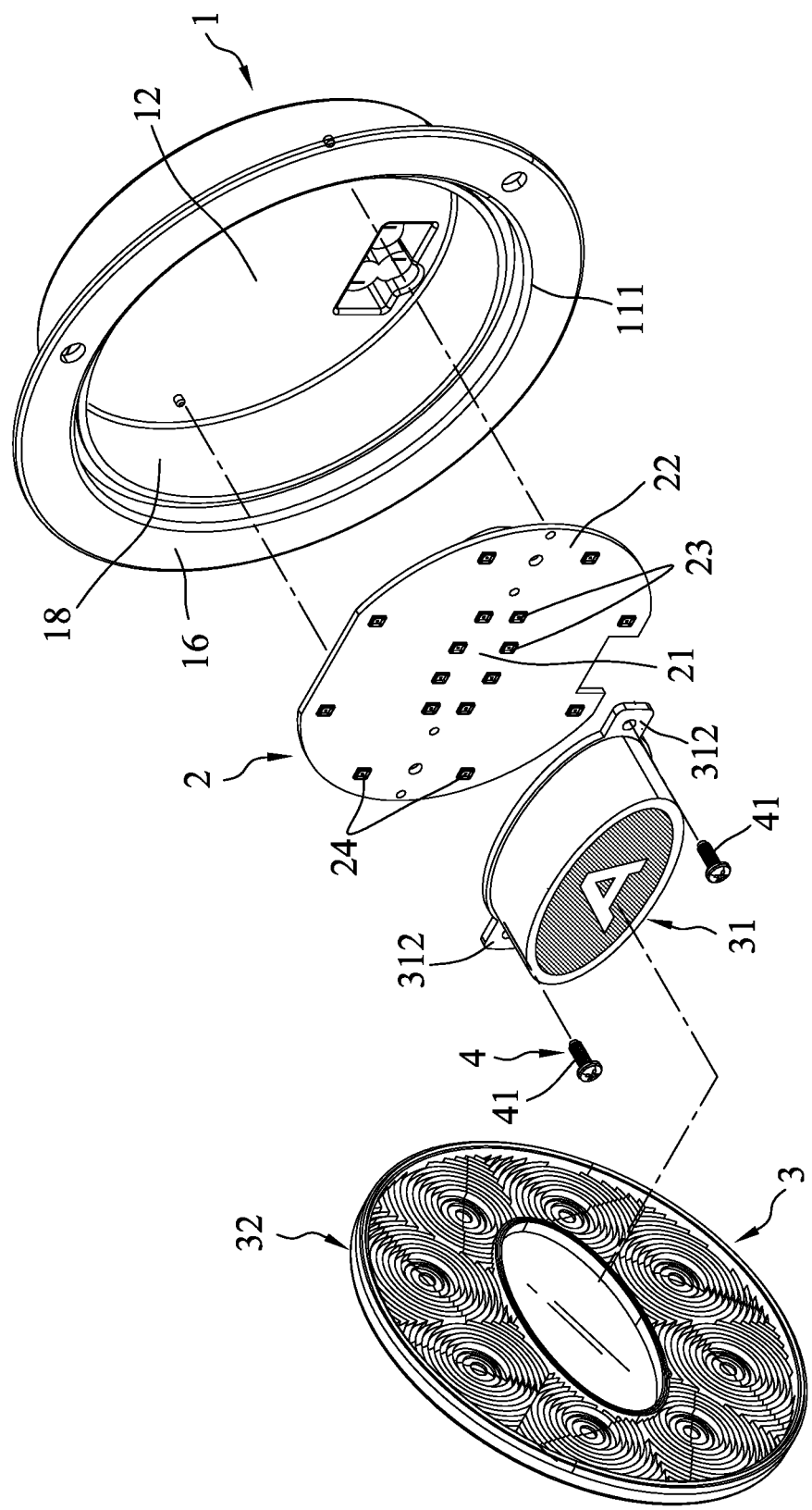
FIG. 4 is an exploded perspective view of a second embodiment of a vehicle lamp according to the disclosure.
Figure 5:
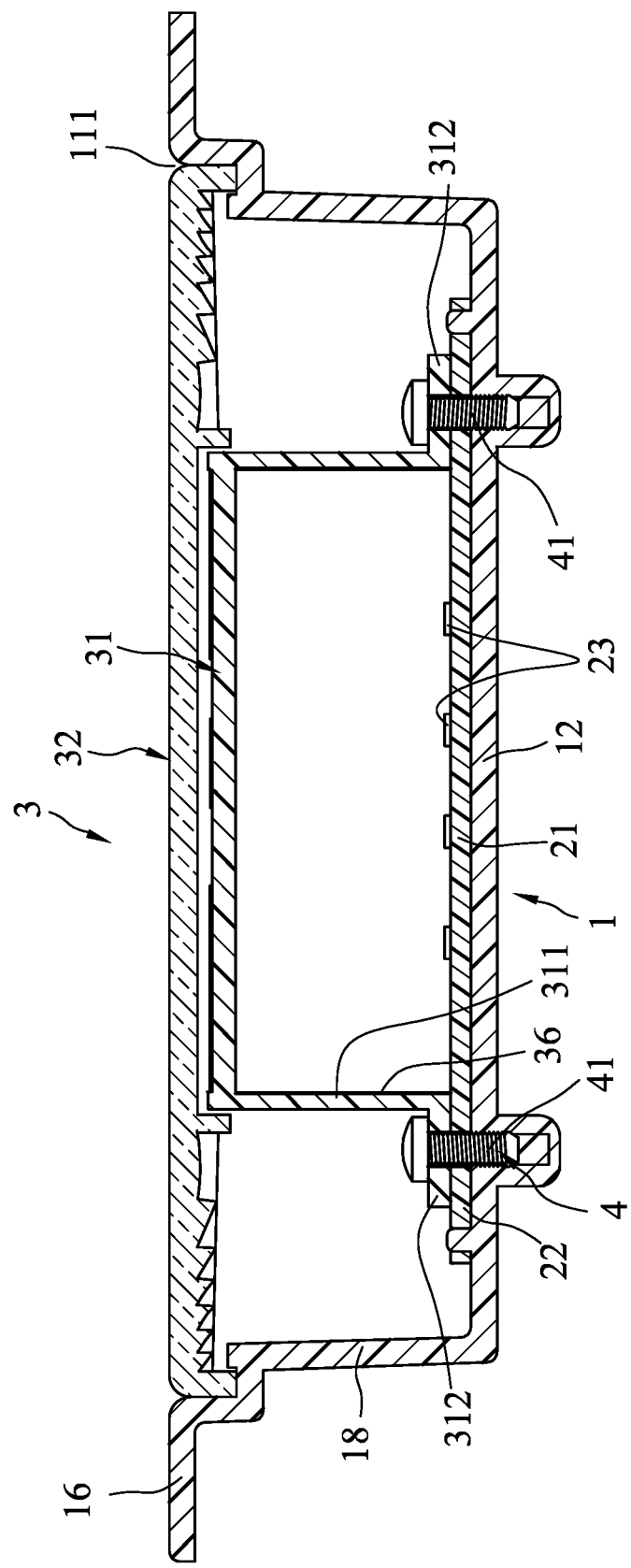
FIG. 5 is a sectional view of the second embodiment.

Referring to FIGS. 4 and 5, a second embodiment of a vehicle lamp according to the disclosure is similar to the first embodiment, the difference being structures of the lamp seat unit 1 and the lighting unit 2. In the second embodiment, the lamp seat unit 1 includes abase wall 12, a surrounding wall 18 extending from a periphery of the base wall 12 and surrounding an axis, and a rim wall 16 extending outwardly from an end of the surrounding wall 18 which is distal from the base wall 12 and extending away from the axis. Moreover, the first circuit board 21 and the second circuit board 22 are molded as one piece and disposed on the base wall 12. Correspondingly, the securing members 41 that are spaced apart from each other instead extend respectively through the ear segments 312 and the lighting unit 2, and are engaged threadedly with the base wall 12. An advantage of the second embodiment is that the structure of the vehicle lamp is simpler compared to the first embodiment.

The dispersing lens 31 of this disclosure may further include a reflecting layer 36 formed on an inner surface of the surrounding segment 311 (see FIG. 5). The reflecting layer 36 prevents interference between lights emitted by the first and second light-emitting members 23, 24.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A vehicle lamp comprising:
   a lamp seat unit defining a receiving space that has an opening;
   a lighting unit disposed in said receiving space and including a first circuit board, a second circuit board that substantially surrounds said first circuit board, a plurality of first light-emitting members that are electrically mounted to said first circuit board, and a plurality of second light-emitting members that are electrically mounted to said second circuit board; and
   a lens unit including
   a dispersing lens that covers said first light-emitting members, a cover lens that is disposed at said opening, that covers said second light-emitting members and said dispersing lens, and that has
a dispersing portion aligned with said dispersing lens, and
a concentrating portion surrounding said dispersing portion and aligned with said second circuit board,
a shielding layer that is mounted to one of said dispersing lens and said dispersing portion, and that has an opaque section and a light-transmissible section;
wherein light emitted by said first light-emitting members passes through said dispersing lens, said light-transmissible section of said shielding layer, and said dispersing portion of said cover lens to produce a dispersing light pattern, said dispersing light pattern having a dark region that results from a shadow of said opaque section of said shielding layer, and a light region that corresponds to said light-transmissible section of said shielding layer; and
wherein light emitted by said second light-emitting members passes through said concentrating portion of said cover lens to produce a concentrated light pattern that surrounds said dispersing light pattern.

2. The vehicle lamp as claimed in claim 1, wherein said shielding layer is mounted to said dispersing lens.

3. The vehicle lamp as claimed in claim 2, wherein:
said dispersing lens has a surrounding segment that is tubular and that substantially surrounds said first light-emitting members, and a dispersing segment that is connected to an end of said surrounding segment distal from said first light-emitting members; and
said shielding layer is mounted to said dispersing segment and is a printed layer.

4. The vehicle lamp as claimed in claim 3, wherein said dispersing lens further includes a reflecting layer formed on an inner surface of said surrounding segment.

5. The vehicle lamp as claimed in claim 3, wherein said concentrating portion of said cover lens has an inner surface facing said second light-emitting members and formed with a plurality of optical microstructures that are respectively aligned with said second light-emitting members.

6. The vehicle lamp as claimed in claim 5, wherein:
said lamp seat unit includes a base wall, a first surrounding wall that extends from a periphery of said base wall and that surrounds an axis, a shoulder segment that extends outwardly from an end of said first surrounding wall distal from said base wall and that extends away from the axis, a second surrounding wall that extends from a periphery of said shoulder wall and that extends away from said first surrounding wall, and a rim wall that extends outwardly from an end of said second surrounding wall distal from said shoulder segment and that extends away from the axis;
said base wall, said first surrounding wall, said shoulder wall, said second surrounding wall and said rim wall cooperatively define said receiving space; and
said first circuit board and said second circuit board are spaced apart from each other, and are respectively disposed on said base wall and said shoulder wall.

7. The vehicle lamp as claimed in claim 6, wherein:
said lamp seat unit further includes a plurality of supporting members extending from said base wall towards said opening;
said dispersing lens further has a plurality of ear segments extending outwardly from an end of said surrounding segment which is proximal to said first light-emitting members, and respectively abutting against said supporting members;
said vehicle lamp further comprises a securing unit including a plurality of securing members, at least one of said securing members extending through said first circuit board and being engaged threadedly with said base segment, the rest of said securing members extending through said second circuit board and respectively through said ear segments, and being engaged threadedly and respectively with said supporting members.

8. The vehicle lamp as claimed in claim 5, wherein:
said lamp seat unit includes a base wall, a surrounding wall extending from a periphery of said base wall and surrounding an axis, and a rim wall extending outwardly from an end of said surrounding wall which is distal from said base wall and extending away from the axis; and
said first circuit board and said second circuit board are molded as one piece, and are disposed on said base wall.

9. The vehicle lamp as claimed in claim 8, wherein:
said dispersing lens further has a plurality of ear segments extending outwardly from an end of said surrounding segment which is proximal to said first light-emitting members;
said vehicle lamp further comprises a securing unit including a plurality of securing members that are spaced apart from each other, that extend respectively through said ear segments and said lighting unit and that are engaged threadedly with said base wall.

* * * * *